US011315335B1

(12) United States Patent
Khoduzadeh (10) Patent No.: US 11,315,335 B1
(45) Date of Patent: Apr. 26, 2022

(54) MIXED-REALITY INTERACTION WITH TOUCH DEVICE

(71) Applicant: Honda Motor Co., Ltd., Tokyo (JP)

(72) Inventor: Alen Khoduzadeh, Winnetka, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/217,007

(22) Filed: Mar. 30, 2021

(51) Int. Cl.
*G06T 19/00* (2011.01)
*G01C 21/00* (2006.01)

(52) U.S. Cl.
CPC ............ *G06T 19/006* (2013.01); *G01C 21/38* (2020.08)

(58) Field of Classification Search
None
See application file for complete search history.

(56) References Cited

U.S. PATENT DOCUMENTS

| 7,861,158 B2 | 12/2010 | Martin et al. |
| 8,432,390 B2 | 4/2013 | Givon |
| 2002/0140633 A1 | 10/2002 | Rafii et al. |
| 2020/0264006 A1 | 8/2020 | Sommer et al. |

FOREIGN PATENT DOCUMENTS

| FR | 3023626 A3 | 1/2016 |
| KR | 201 80120881 A | 11/2018 |
| KR | 20180120878 A | 11/2018 |
| KR | 201 90000071 A | 1/2019 |
| KR | 20190000067 A | 1/2019 |
| KR | 20190000076 A | 1/2019 |

OTHER PUBLICATIONS

McGill et al. Challenges in passenger use of mixed reality headsets in cars and other transportation (Year: 2019).*
Frisson et al. Designing Vibrotactile Widgets with Printed Actuators and Sensors (Year: 2017).*
Xiao et al, MRTouch: Adding Touch Input to Head-Mounted Mixed Reality (Year: 2018).*

\* cited by examiner

*Primary Examiner* — Robert J Craddock
(74) *Attorney, Agent, or Firm* — Rankin, Hill & Clark LLP (57) ABSTRACT

A system for mixed-reality interaction with a touch device may include a mixed-reality device including a sensor, a mapping device, a simulator, and a display and a touch device including an input device. The input device of the touch device and the sensor of the mixed-reality device may detect a human-touch-device interaction. The mapping device may calibrate, correlate, and map the human-touch-device interaction from a real-world environment to a mixed-reality environment. The input device of the touch device may receive an input based on the human-touch-device interaction. The simulator of the mixed-reality device may render a view of the human-touch-device interaction within the mixed-reality environment and a view of an action within the mixed-reality environment corresponding to the input determined based on the human-touch-device interaction. The display of the mixed-reality device may display the rendered views.

20 Claims, 6 Drawing Sheets

MIXED-REALITY INTERACTION WITH TOUCH DEVICE

BACKGROUND

Human machine interfaces (HMIs) have been built for many purposes, and are often utilized in a variety of situations or scenarios. For example, automobiles, and other vehicles, may have display screens through which a user interacts with the vehicle. Such display screens are navigable by way of various inputs, such as touch-screens, buttons, knobs, gestures, or voice. Usually such display screens are integral to the vehicle, but a display screen may be part of a portable mobile device, such as a phone or tablet, which is suitably connected to the vehicle such that inputs to the portable device control the vehicle and signals from the vehicle are transmitted to the portable device.

BRIEF DESCRIPTION

According to one aspect, a system for mixed-reality interaction with a touch device may include a mixed-reality device and a touch device. The mixed-reality device may include a sensor, a mapping device, a simulator, and a display. The touch device may include an input device. The input device of the touch device may detect a human-touch-device interaction. The sensor of the mixed-reality device may detect the same human-touch-device interaction. The mapping device may calibrate, correlate, and map the human-touch-device interaction from a real-world environment to a mixed-reality environment. The input device of the touch device may receive an input based on the human-touch-device interaction. The simulator of the mixed-reality device may render a view of the human-touch-device interaction within the mixed-reality environment and render a view of an action within the mixed-reality environment corresponding to the input determined based on the human-touch-device interaction. The display of the mixed-reality device may display the rendered views.

The sensor of the mixed-reality device may be an image capture device. The mixed-reality device may be a mixed-reality headset. The touch device may be a touchscreen. The mixed-reality device may include a speaker playing an audio confirmation when the human-touch-device interaction is detected. The touch device may include a speaker playing an audio confirmation when the human-touch-device interaction is detected.

The sensor of the mixed-reality device may detect the human-touch-device interaction based on the input device of the touch device detecting the human-touch-device interaction. The mapping device may calibrate, correlate, and map the human-touch-device interaction from the real-world environment to the mixed-reality environment based on the input device of the touch device detecting the human-touch-device interaction. The input received based on the human-touch-device interaction may be an instruction to open a navigation application. The simulator of the mixed-reality device may render a view of a launching of the navigation application within the mixed-reality environment.

According to one aspect, a system for mixed-reality interaction with a touch device may include a mixed-reality device and a touch device. The mixed-reality device may include a sensor, a mapping device, a simulator, and a display. The touch device may include an input device. The input device of the touch device may detect a human-touch-device interaction. The sensor of the mixed-reality device may detect the same human-touch-device interaction based on the input device of the touch device detecting the human-touch-device interaction. The mapping device may calibrate, correlate, and map the human-touch-device interaction from a real-world environment to a mixed-reality environment. The input device of the touch device may receive an input based on the human-touch-device interaction. The simulator of the mixed-reality device may render a view of the human-touch-device interaction within the mixed-reality environment and may render a view of an action within the mixed-reality environment corresponding to the input determined based on the human-touch-device interaction. The display of the mixed-reality device may display the rendered views.

The sensor of the mixed-reality device may be an image capture device. The mixed-reality device may be a mixed-reality headset. The touch device may be a touchscreen. The mixed-reality device includes a speaker playing an audio confirmation when the human-touch-device interaction is detected. The touch device includes a speaker playing an audio confirmation when the human-touch-device interaction is detected.

According to one aspect, a method for mixed-reality interaction with a touch device may include detecting, via an input device of a touch device, a human-touch-device interaction, detecting, via a sensor of a mixed-reality device, the same human-touch-device interaction, calibrating, correlating, and mapping, via a mapping device of the mixed-reality device, the human-touch-device interaction from a real-world environment to a mixed-reality environment, receiving, via the input device of the touch device, an input based on the human-touch-device interaction, rendering, via a simulator of the mixed-reality device, a view of the human-touch-device interaction within the mixed-reality environment, rendering, via the simulator of the mixed-reality device, a view of an action within the mixed-reality environment corresponding to the input determined based on the human-touch-device interaction, and displaying, via a display of the mixed-reality device, the rendered views.

The method may include detecting, via the sensor of the mixed-reality device, the human-touch-device interaction based on the input device of the touch device detecting the human-touch-device interaction. The method may include calibrating, correlating, and mapping, via the mapping device of the mixed-reality device, the human-touch-device interaction from the real-world environment to the mixed-reality environment based on the input device of the touch device detecting the human-touch-device interaction. The input received based on the human-touch-device interaction may be an instruction to open a navigation application.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Figure 1:
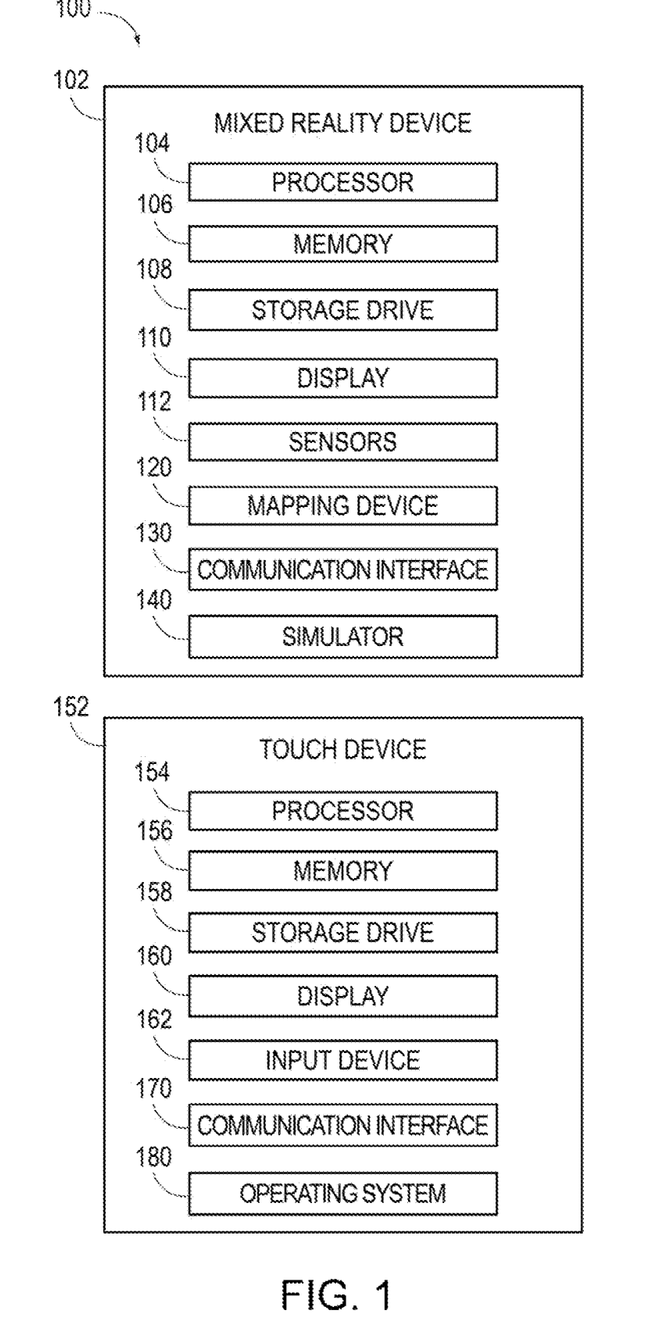
FIG. 1 is an exemplary component diagram of a system for mixed-reality interaction with touch device, according to one aspect.

FIG. 1 is an exemplary component diagram of a system 100 for mixed-reality interaction with touch device 152, according to one aspect. The system 100 for mixed-reality interaction with a touch device 152 may include a mixed-reality device 102 and a touch device 152. The mixed-reality device 102 may include a processor 104, a memory 106, a storage drive 108, a display 110, a sensor or sensors 112, a mapping device 120, a communication interface 130, a simulator 140. The mixed-reality device 102 may be a mixed-reality headset. The communication interface 130 of the mixed-reality device 102 may include a speaker playing an audio confirmation when the human-touch-device interaction is detected. The communication interface 130 of the mixed-reality device 102 may include a transmitter, a receiver, a transceiver, etc. and/or one or more buses interconnecting components of the mixed-reality device 102, forming operable connections between respective components, thereby enabling computer communication between the respective components and between the mixed-reality device 102, the touch device 152, and/or other devices, such as mobile devices, remote servers, one or more vehicle systems, etc.

Figure 2:
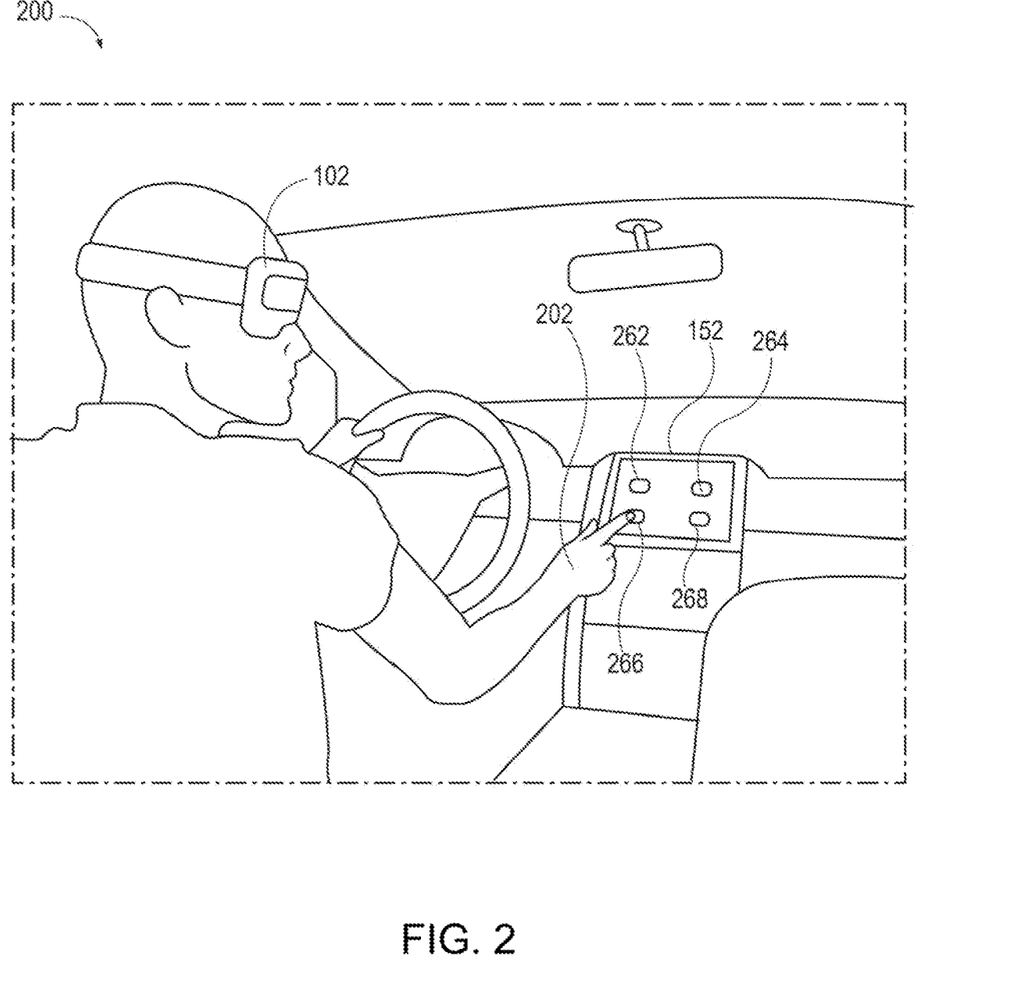
FIG. 2 is an exemplary real-world view of an implementation of the system for mixed-reality interaction with touch device, according to one aspect.

The touch device 152 may include a processor 154, a memory 156, a storage drive 168, a display 160, an input device 162, a communication interface 170, and an operating system 180, which may be utilized to render one or more graphic elements, such as the buttons described in FIG. 2. The touch device 152 may be a touchscreen, touchpad, trackpad, etc. The communication interface 170 of the touch device 152 may include a speaker playing an audio confirmation when the human-touch-device interaction is detected. The communication interface 170 of the touch device 152 may include a transmitter, a receiver, a transceiver, etc. and/or one or more buses interconnecting components of the touch device 152, forming operable connections between respective components, thereby enabling computer communication between the respective components and between the touch device 152, the mixed-reality device 102, and/or other devices, such as mobile devices, remote servers, one or more vehicle systems, etc.

The input device 162 of the touch device 152 may detect a human-touch-device interaction. The input device 162 of the touch device 152 may receive or determine an input based on the human-touch-device interaction.

One or more components of the system 100 for mixed-reality interaction with touch device 152 may be implemented via the processor 104, the memory 106, and the storage drive 108 of the mixed-reality device 102 and/or be implemented via the processor 154, the memory 156, and the storage drive 158 of the touch device 152. For example, the mapping device 120 may be implemented via the processor 104 and memory 106 of the mixed-reality device 102.

The sensor 112 of the mixed-reality device 102 may detect the same human-touch-device interaction. The sensor 112 of the mixed-reality device 102 may be an image capture device. The sensor 112 of the mixed-reality device 102 may detect the human-touch-device interaction. According to one aspect, the sensor 112 of the mixed-reality device 102 may detect the human-touch-device interaction based on the input device 162 of the touch device 152 detecting the human-touch-device interaction thereby facilitating calibration correlation, and mapping for the mapping device 120 between a real-world environment and a mixed-reality environment.

The mapping device 120 may calibrate, correlate, and map the human-touch-device interaction from the real-world environment to the mixed-reality environment. The mapping device 120 may calibrate, correlate, and map the human-touch-device interaction from the real-world environment to the mixed-reality environment based on the input device 162 of the touch device 152 detecting the human-touch-device interaction. In other words, the mapping device 120 may initiate a calibration phase for the system 100 for mixed-reality interaction with touch device 152 where a user may be asked to touch the input device 162 of the touch device 152. The input device 162 may receive an input from the human-touch-device interaction as a result of the touch, and simultaneously or concurrently, the mapping device 120 may utilize the sensors 112, such as an image capture device, to perform calibration between the real-world environment and the mixed-reality environment, thereby synchronizing both environments from a rendering and display standpoint. The calibration phase for the system 100 for mixed-reality interaction with touch device 152 may include requesting the user to touch several buttons, such as the buttons shown in FIGS. 2-3 (e.g., buttons 262, 264, 266, 268, which are associated with and correspond to buttons 362, 364, 366, 368).

Therefore, when the user touches the input device 162 of the touch device 152 in the real-world environment, a user input is received based on this human-touch-device interaction. The user will also feel his or her finger touching the input device 162 of the touch device 152. The mixed-reality device 102, may, simultaneously using the simulator 140, generate a mixed-reality representation or view of this exact event occurring, but within the mixed-reality environment. Thus, the display 110 of the mixed-reality device 102 may display to the user, his or her finger touching the input device 162 of the touch device 152, from the view of the mixed-reality environment. After the user input is received based on this human-touch-device interaction, the simulator 140 may generate a simulation based on the corresponding selected action, such as by launching a selected application, executing a selected action, etc. This selected action may be passed from the communication interface 170 of the touch device 152 to one or more vehicle systems (e.g., via the vehicle CAN), for example, such as when the action is to adjust a seat setting, a window setting, a temperature setting, etc. of the vehicle.

One example of an input may be an input received based on the human-touch-device interaction of an instruction to open a navigation application. Another example of an input may be an input related to one or more vehicle systems, such as an input to adjust the vehicle temperature, window settings, seat settings, etc.

The simulator 140 of the mixed-reality device 102 may render a view of the human-touch-device interaction within the mixed-reality environment and render a view of an action within the mixed-reality environment corresponding to the input determined based on the human-touch-device interaction. According to the example where the input is the instruction to open the navigation application, the simulator 140 of the mixed-reality device 102 may render a view of a launching of the navigation application within the mixed-reality environment. The display 110 of the mixed-reality device 102 may display the rendered views in a manner where the mixed-reality view of the user's finger and the touch device 152 mirrors the real-world view of the user's finger and the touch device 152.

The simulator 140 and the display 110 of the mixed-reality device 102 may further render simulations based on actions selected by the user from the buttons of the touch device 152.

In this way, a user may interact in virtual reality or mixed-reality through a human-machine interface (HMI) (e.g., the system 100 for mixed-reality interaction with touch device 152). Specifically, the mixed-reality device 102 may broadcast or render a view to the user and the user may interact with the rendered view or simulation via a vehicle mounted touch device 152, such as the HMI, a touchscreen, or a touchpad, for example. The mixed-reality device 102 may simulate and render interaction rich environments which may be presented on the display 110 of the mixed-reality device 102 while enabling tactile interaction via the touch device 152 in the real world, which may be utilized to receive inputs which may be applied in the virtual or mixed-reality environment. Since the interaction rich environment are presented as simulations within the mixed-reality environment, no virtual reality controllers are required.

FIG. 2 is an exemplary real-world view 200 of an implementation of the system 100 for mixed-reality interaction with touch device 152, according to one aspect. As seen in FIG. 2, a user is wearing the mixed-reality device 102 and using a human finger 202 to interact with the touch device 152 equipped in a vehicle, thereby engaging in human-touch-device interaction. In this example, there are four different predefined buttons 262, 264, 266, 268 rendered on the touch device 152. The finger 202 is touching button 266, and the mapping device 120 of the mixed-reality device 102 may utilize the touch response from the touch device 152 indicating the touch at the button 266 to calibrate the mixed-reality device 102, and render views accordingly.

Figure 3:
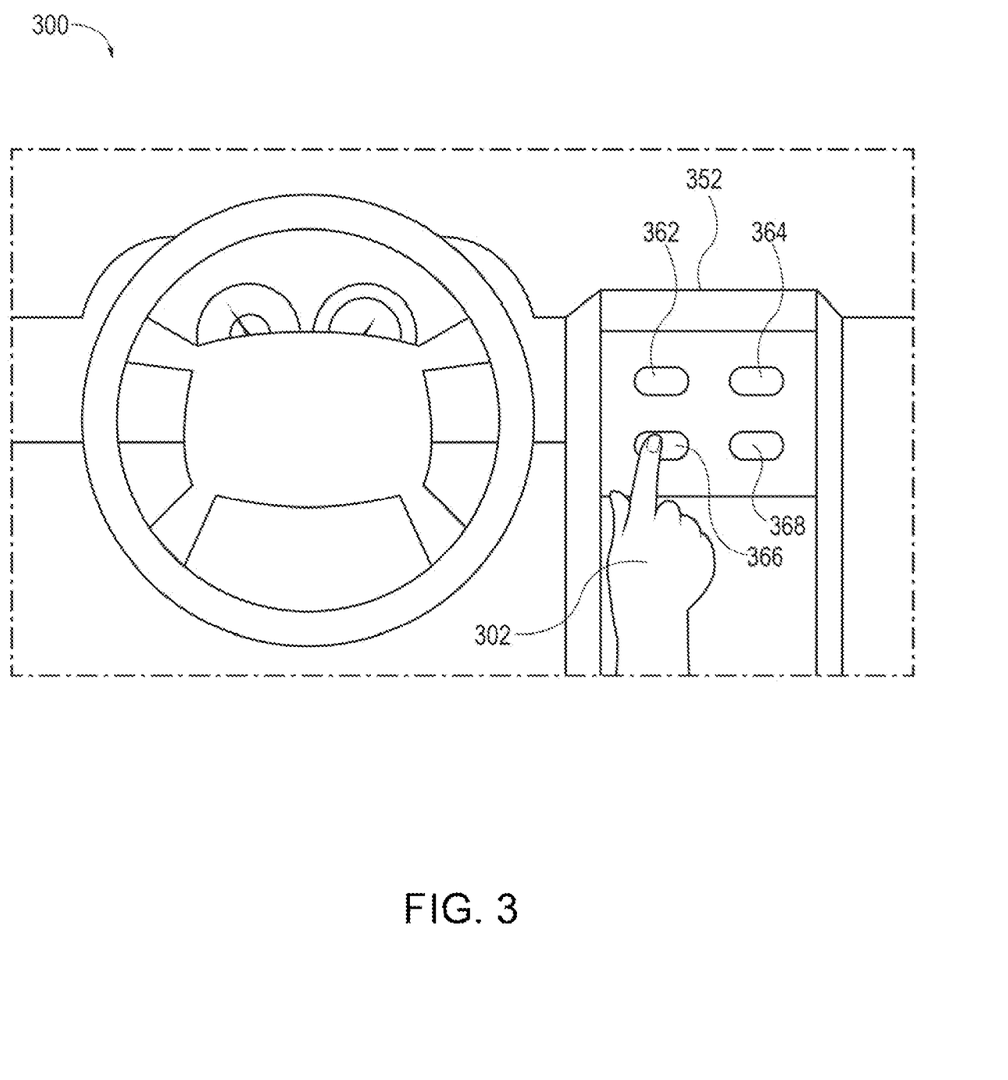
FIG. 3 is an exemplary mixed-reality view of an implementation of the system for mixed-reality interaction with touch device, according to one aspect.

In this regard, FIG. 3 is an exemplary mixed-reality or virtual reality view 300 of an implementation of the system 100 for mixed-reality interaction with touch device 152, according to one aspect. FIG. 3 may be a view corresponding to what the user of FIG. 3 would see. In other words, the simulator 140 of the mixed-reality device 102 may render, and the display 110 of the mixed-reality device 102 may display the view 300 when the scenario from FIG. 2 is occurring in the real-world environment.

Within FIG. 3, a mixed-reality or virtual reality view of the user's finger 302 is presented. Additionally, a mixed-reality or virtual reality view of the touch device 152 is rendered and displayed. The four different predefined buttons 262, 264, 266, 268 from the touch device 152 of FIG. 2 are rendered as predefined buttons 362, 364, 366, 368 within the mixed-reality environment. According to one aspect, the communication interface 170 of the touch device 152 may pipe or transfer the actual display contents from the display 160 of the touch device 152 to the communication interface 130 of the mixed-reality device 102, which may then render and display the piped contents from the display 160 of the touch device 152 on the display 110 of the mixed-reality device 102.

Figure 4:
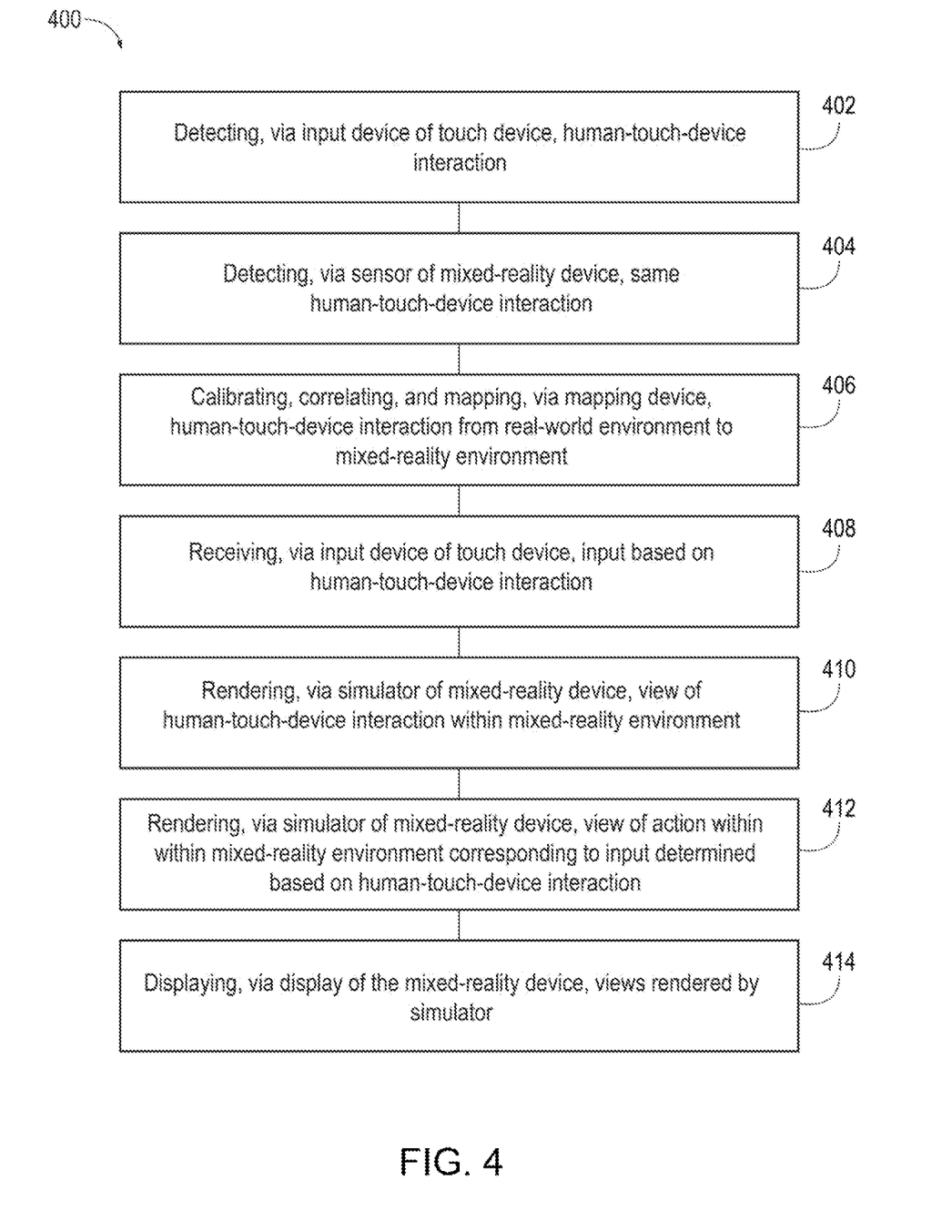
FIG. 4 is an exemplary flow diagram of a method for mixed-reality interaction with touch device, according to one aspect.

FIG. 4 is an exemplary flow diagram of a method 400 for mixed-reality interaction with touch device, according to one aspect. The method 400 for mixed-reality interaction with a touch device may include detecting 402, via an input device of a touch device, a human-touch-device interaction, detecting 404, via a sensor of a mixed-reality device, the same human-touch-device interaction, calibrating, correlating, and mapping 406, via a mapping device of the mixed-reality device, the human-touch-device interaction from a real-world environment to a mixed-reality environment, receiving 408, via the input device of the touch device, an input based on the human-touch-device interaction, rendering 410, via a simulator of the mixed-reality device, a view of the human-touch-device interaction within the mixed-reality environment, rendering 412, via the simulator of the mixed-reality device, a view of an action within the mixed-reality environment corresponding to the input determined based on the human-touch-device interaction, and displaying 414, via a display of the mixed-reality device, the rendered views.

The method 400 may also include detecting, via the sensor of the mixed-reality device, the human-touch-device interaction based on the input device of the touch device detecting the human-touch-device interaction and/or calibrating, correlating, and mapping, via the mapping device of the mixed-reality device, the human-touch-device interaction from the real-world environment to the mixed-reality environment based on the input device of the touch device detecting the human-touch-device interaction. The input received based on the human-touch-device interaction may be an instruction to open a navigation application.

Figure 5:
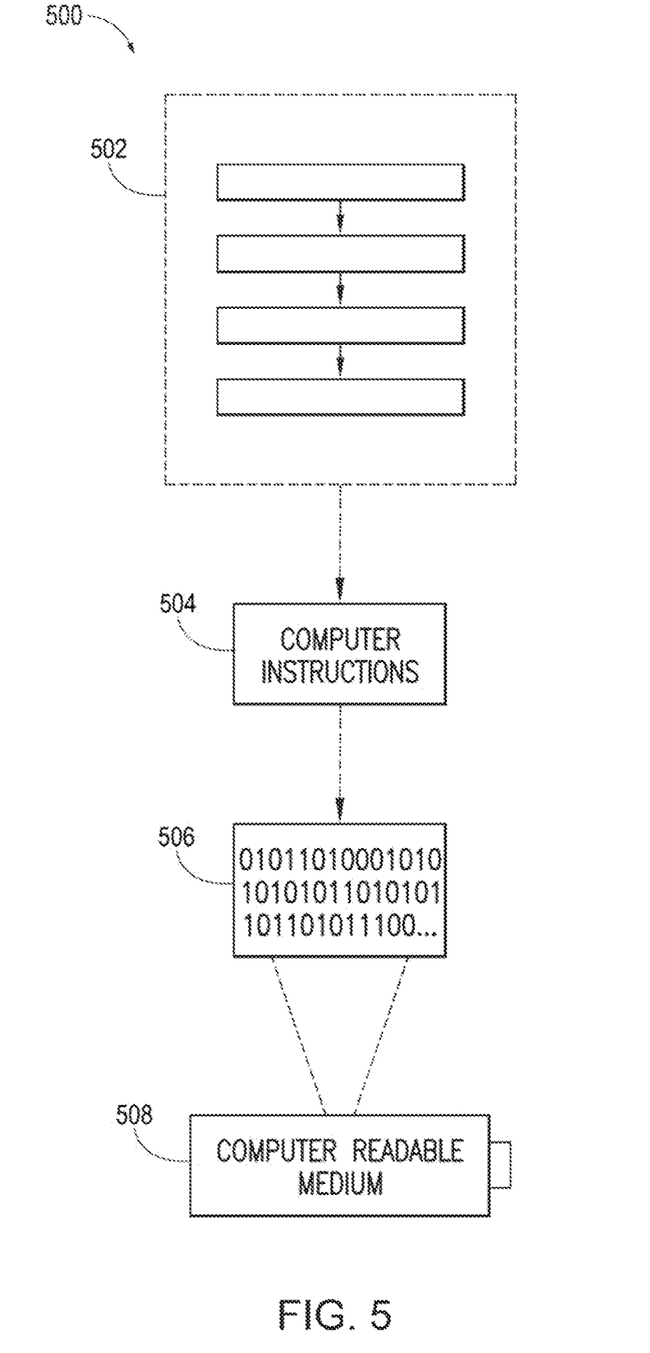
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 400 of FIG. 4. In another aspect, the processor-executable computer instructions 504 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
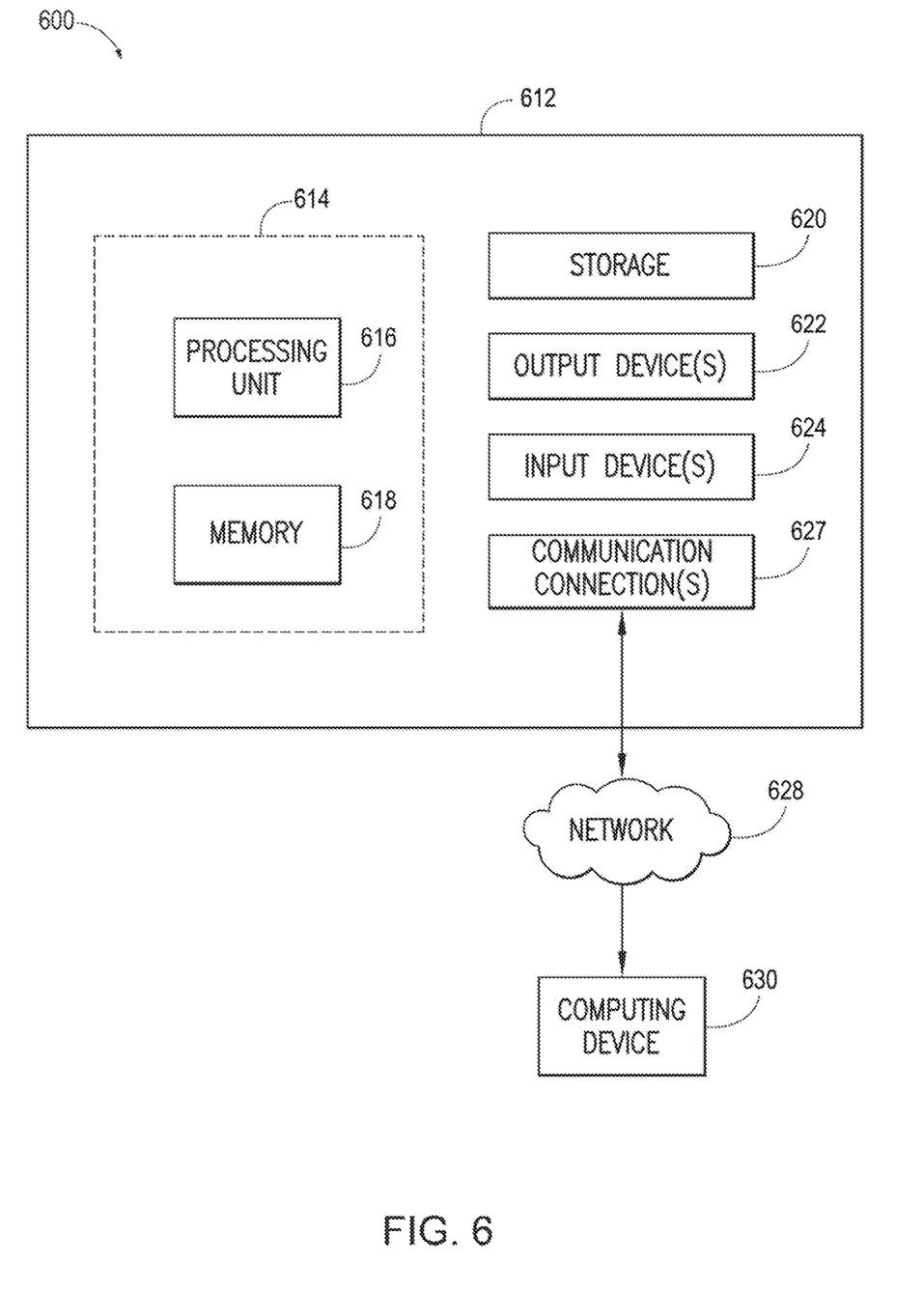
FIG. 6 is an illustration of an example computing environment where one or more of the provisions set forth herein are implemented, according to one aspect.

FIG. 6 and the following discussion provide a description of a suitable computing environment to implement aspects of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one aspect provided herein. In one configuration, the computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other aspects, the computing device 612 includes additional features or functionality. For example, the computing device 612 may include additional storage such as removable storage or non-removable storage, including, but not limited to, magnetic storage, optical storage, etc. Such additional storage is illustrated in FIG. 6 by storage 620. In one aspect, computer readable instructions to implement one aspect provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 612. Any such computer storage media is part of the computing device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 612 includes input device(s) 624 such as keyboard, mouse, pen, voice input device, touch input device, infrared cameras, video input devices, or any other input device. Output device(s) 622 such as one or more displays, speakers, printers, or any other output device may be included with the computing device 612. Input device(s) 624 and output device(s) 622 may be connected to the computing device 612 via a wired connection, wireless connection, or any combination thereof. In one aspect, an input device or an output device from another computing device may be used as input device(s) 624 or output device(s) 622 for the computing device 612. The computing device 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for mixed-reality interaction with a touch device, comprising:
    a mixed-reality device, including:
        a sensor;
        a mapping device;
        a simulator; and
        a display; and
    a touch device including an input device, wherein:
        the input device of the touch device detects a human-touch-device interaction;
        the sensor of the mixed-reality device detects the same human-touch-device interaction;

the mapping device calibrates, correlates, and maps the human-touch-device interaction from a real-world environment to a mixed-reality environment;

the input device of the touch device receives an input based on the human-touch-device interaction;

the simulator of the mixed-reality device renders a view of the human-touch-device interaction within the mixed-reality environment and renders a view of an action within the mixed-reality environment corresponding to the input determined based on the human-touch-device interaction; and the display of the mixed-reality device displays the rendered views.

2. The system for mixed-reality interaction with the touch device of claim 1, wherein the sensor of the mixed-reality device is an image capture device.

3. The system for mixed-reality interaction with the touch device of claim 1, wherein the mixed-reality device is a mixed-reality headset.

4. The system for mixed-reality interaction with the touch device of claim 1, wherein the touch device is a touchscreen.

5. The system for mixed-reality interaction with the touch device of claim 1, wherein the mixed-reality device includes a speaker playing an audio confirmation when the human-touch-device interaction is detected.

6. The system for mixed-reality interaction with the touch device of claim 1, wherein the touch device includes a speaker playing an audio confirmation when the human-touch-device interaction is detected.

7. The system for mixed-reality interaction with the touch device of claim 1, wherein the sensor of the mixed-reality device detects the human-touch-device interaction based on the input device of the touch device detecting the human-touch-device interaction.

8. The system for mixed-reality interaction with the touch device of claim 1, wherein the mapping device calibrates, correlates, and maps the human-touch-device interaction from the real-world environment to the mixed-reality environment based on the input device of the touch device detecting the human-touch-device interaction.

9. The system for mixed-reality interaction with the touch device of claim 1, wherein the input received based on the human-touch-device interaction is an instruction to open a navigation application.

10. The system for mixed-reality interaction with the touch device of claim 9, wherein the simulator of the mixed-reality device renders a view of a launching of the navigation application within the mixed-reality environment.

11. A system for mixed-reality interaction with a touch device, comprising:
a mixed-reality device, including:
a sensor;
a mapping device;
a simulator; and
a display; and
a touch device including an input device, wherein:
the input device of the touch device detects a human-touch-device interaction;

the sensor of the mixed-reality device detects the same human-touch-device interaction based on the input device of the touch device detecting the human-touch-device interaction;

the mapping device calibrates, correlates, and maps the human-touch-device interaction from a real-world environment to a mixed-reality environment;

the input device of the touch device receives an input based on the human-touch-device interaction;

the simulator of the mixed-reality device renders a view of the human-touch-device interaction within the mixed-reality environment and renders a view of an action within the mixed-reality environment corresponding to the input determined based on the human-touch-device interaction; and the display of the mixed-reality device displays the rendered views.

12. The system for mixed-reality interaction with the touch device of claim 11, wherein the sensor of the mixed-reality device is an image capture device.

13. The system for mixed-reality interaction with the touch device of claim 11, wherein the mixed-reality device is a mixed-reality headset.

14. The system for mixed-reality interaction with the touch device of claim 11, wherein the touch device is a touchscreen.

15. The system for mixed-reality interaction with the touch device of claim 11, wherein the mixed-reality device includes a speaker playing an audio confirmation when the human-touch-device interaction is detected.

16. The system for mixed-reality interaction with the touch device of claim 11, wherein the touch device includes a speaker playing an audio confirmation when the human-touch-device interaction is detected.

17. A method for mixed-reality interaction with a touch device, comprising:
detecting, via an input device of a touch device, a human-touch-device interaction;
detecting, via a sensor of a mixed-reality device, the same human-touch-device interaction;
calibrating, correlating, and mapping, via a mapping device of the mixed-reality device, the human-touch-device interaction from a real-world environment to a mixed-reality environment;
receiving, via the input device of the touch device, an input based on the human-touch-device interaction;
rendering, via a simulator of the mixed-reality device, a view of the human-touch-device interaction within the mixed-reality environment;
rendering, via the simulator of the mixed-reality device, a view of an action within the mixed-reality environment corresponding to the input determined based on the human-touch-device interaction; and
displaying, via a display of the mixed-reality device, the rendered views.

18. The method for mixed-reality interaction with the touch device of claim 17, comprising detecting, via the sensor of the mixed-reality device, the human-touch-device interaction based on the input device of the touch device detecting the human-touch-device interaction.

19. The method for mixed-reality interaction with the touch device of claim 17, calibrating, correlating, and mapping, via the mapping device of the mixed-reality device, the human-touch-device interaction from the real-world environment to the mixed-reality environment based on the input device of the touch device detecting the human-touch-device interaction.

20. The method for mixed-reality interaction with the touch device of claim 17, wherein the input received based on the human-touch-device interaction is an instruction to open a navigation application.

* * * * *

UNITED STATES PATENT AND TRADEMARK OFFICE
CERTIFICATE OF CORRECTION

| | | |
|---|---|---|
| PATENT NO. | : 11,315,335 B1 | |
| APPLICATION NO. | : 17/217007 | |
| DATED | : April 26, 2022 | |
| INVENTOR(S) | : Khoduzadeh et al. | |

It is certified that error appears in the above-identified patent and that said Letters Patent is hereby corrected as shown below:

On the Title Page

Under item (12), "Khoduzadeh" should read --Khoduzadeh et al.--

Item (72) Inventors:, add:
"Daniel B. GAST, Torrance, CA (US); Bradford D. KENT, San Pedro, CA (US); Michael M. TSAY, Irvine, CA (US)"

Signed and Sealed this
Thirtieth Day of January, 2024

*Katherine Kelly Vidal*

Katherine Kelly Vidal
*Director of the United States Patent and Trademark Office*